US010397225B2

(12) United States Patent
Shue

(10) Patent No.: US 10,397,225 B2
(45) Date of Patent: Aug. 27, 2019

(54) SYSTEM AND METHOD FOR NETWORK ACCESS CONTROL

(71) Applicant: Worcester Polytechnic Institute, Worcester, MA (US)

(72) Inventor: Craig A. Shue, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 186 days.

(21) Appl. No.: 15/247,471

(22) Filed: Aug. 25, 2016

(65) Prior Publication Data

US 2017/0063859 A1    Mar. 2, 2017

Related U.S. Application Data

(60) Provisional application No. 62/209,929, filed on Aug. 26, 2015, provisional application No. 62/265,630, filed on Dec. 10, 2015.

(51) Int. Cl.
| | |
|---|---|
| *H04L 29/06* | (2006.01) |
| *H04W 72/04* | (2009.01) |
| *H04L 29/08* | (2006.01) |
| *H04L 12/801* | (2013.01) |
| *H04L 12/927* | (2013.01) |
| *H04W 88/12* | (2009.01) |

(52) U.S. Cl.
CPC .............. *H04L 63/10* (2013.01); *H04L 47/14* (2013.01); *H04L 47/808* (2013.01); *H04L 63/20* (2013.01); *H04L 67/22* (2013.01); *H04W 72/04* (2013.01); *H04W 88/12* (2013.01)

(58) Field of Classification Search
CPC ......... H04L 63/10; H04L 67/22; H04L 47/14; H04L 63/20; H04L 47/808; H04W 72/04; H04W 88/12
See application file for complete search history.

(56) References Cited

U.S. PATENT DOCUMENTS

| | | | |
|---|---|---|---|
| 6,195,703 B1 * | 2/2001 | Blumenau | G06F 9/505 709/211 |
| 9,887,977 B2 * | 2/2018 | Mochizuki | H04L 63/08 |

(Continued)

OTHER PUBLICATIONS

Shirley et al.—Fighting Malware by Tracking User Intentions—NPL 2009 (Year: 2009).*

(Continued)

*Primary Examiner* — Tri M Tran
(74) *Attorney, Agent, or Firm* — Duquette Law Group, Inc.

(57) ABSTRACT

Embodiments of the innovation relate to, in an access controller, a method for providing access to a network resource. The method includes receiving, by the access controller, a network access request and user interaction information associated with the network access request from the client device, the user access information received with the network access request from the client device. The method includes comparing, by the access controller, the user interaction information with a policy corresponding to the user interaction information. The method includes providing communication, by the access controller, between the client device and the network resource associated with the network access request in response to detecting an association between the user interaction information and the policy.

18 Claims, 6 Drawing Sheets

(56) References Cited

U.S. PATENT DOCUMENTS

| | | | | |
|---|---|---|---|---|
| 2004/0177276 | A1* | 9/2004 | MacKinnon | H04L 63/0263 726/5 |
| 2008/0034425 | A1* | 2/2008 | Overcash | G06F 21/55 726/22 |
| 2014/0258900 | A1* | 9/2014 | Dardailler | G06F 3/0482 715/765 |
| 2014/0304764 | A1* | 10/2014 | Banerjee | H04L 63/02 726/1 |
| 2015/0229609 | A1* | 8/2015 | Chien | H04L 63/101 726/13 |

OTHER PUBLICATIONS

International Search Report dated Nov. 4, 2016 From Corresponding International Application No. PCT/US2016/048730.

William A. Arbaugh, David J. Farber, and Jonathan M. Smith; A Secure and Reliable Bootstrap Architecture; University of Pennsylvania Department of Computer and Information Science Technical Report No. MS-CIS-96-35; Dec. 2, 1996.

Steven M. Bellovin; Distributed Firewalls; Feature USENIX; Dec. 8, 1999.

Yaniv Ben-Itzhak, Katherine Barabash, Rami Cohen, Anna Levin, Eran Raichstein; EnforSDN: Network Policies Enforcement With SDN; IFID/IEEE International symposium on Intergrated Network Management; 2015.

Rodrigo Braga, Edjard Mota, Alexandre Passito; Lightweight DDoS Flooding Attack Detection Using NOX/Openflow; 35th Annual IEEE Conference on Local Computer Networks; Oct. 2010.

Martin Casado, Michael J. Freedman, Justin Pettit, Jianying Luo, Nick Mckeown; and Scott Shenker U.C. Berkeley and ICSI: Ethane: Taking Control of the Enterprise:SIGCOMM'07, Aug. 27-31, 2007.

Jake Collings and Jun Liu; An Openflow-Based Prototype of SDN-Oriented Stateful Hardware Firewalls; 2014 IEEE 22nd International Conference on Network Protocols; 2014.

Mehiar Dabbagh, Bechir Hamdaoui, Mohsen Guizani and Ammar Rayes: Software-Defined Networking Security: Pros and Cons; Communications Magizine, IEEE 53.6; 2015.

Hongxin Hu, Wonkyu, Gail-Joon Ahu, and Ziming Zhao: Flowguard: Building Robust Firewalls for Software-Defined Networks; HotSDN'14, Aug. 22, 2014.

Zhiyuan Hu, Mingwen Wang, Xueqiang Yan, Yueming Yin, and Zhigang Luo; A Comprehensive Security Architecture for SDN; 2015 18th International Conference on Intelligence in Next Generation Networks,2015.

Sotiris Ioannidis, Angelos D. Keromytis, Steve M. Bellovin and Jonathan M. Smith: Implementing a Distributed Firewall; CCS '00 2000.

Kun-Chan Lan, Alefiya Hussain, and Debojyoti Dutta; Effect of Malicious Traffic on the Network; USC/ISI; 2003.

Butler Lampson, Martin Abadi, Michael Burrows, and Edward Wobber; Authentication in Distributed Systems: Theory and Practice; ACM Transactions on Computer Systems (TOCS) 10.4; pp. 265-310; (1992).

Marc Lelarge; Economics of Malware: Epidemic Risks Model, Network Externalities and Incentives; Allerton 2009. 47th Annual Allerton Conference on. Sep. 2009, pp. 1353-1360. 2009.

Nick Mckeown, Tom Anderson, Hari Balakrishnan, Guru Parulkar, Larry Peterson, Jennifer Rexford, Scott Shenker, and Jonathan Turner: Openflow: Enabling Innovation in Campus Networks; SIGCOMM Comput. Commun. Rev. 38.2, pp. 69-74. Mar. 2008.

Syed Akbar Mehdi, Junaid Khalid, and Syed Ali Khayam: Revisiting Traffic Anomaly Detection Using Software Defined Networking; Recent Advances in Intrusion Detection. pp. 161-180; 2011.

Hilarie Orman, Published by the IEEE Computer Society; The Morris Worm: A Fifteen-Year Perspective; IEEE Security & Privacy 5, pp. 35-43; 2005.

Ben Pfaff, Justin Pettit, Teemu Koponen, Ethan J. Jackson, Andy Zhou, Jarno Rajahalme, Jesse Gross, Alex Wang, Jonathan Stringer, Pravin Shelar, Keith Amidon, and Martin Casado: The Design and Implementation of Open vSWITCH; 12th USENIX Symposium on Networked Systems Design and Implementation; 2015.

Sandra Scott-Hayward, Gemma O'Callaghan, and Sakir Sezer: Sdn Security: A Survey; Future Networks and Services (SDN4FNS), 2013 IEEE SDN for. IEEE. 2013, pp. 1-7; 2013.

Jeffrey Shirley and David Evans: The User is Not the Enemy: Fighting Malware by Tracking User Intentions; Proceedings of the 2008 workshop on New security paradigms. ACM; pp. 33-45; 2009.

Curtis R. Taylor, Douglas C. Macfarland, Doran R. Smestad, and Craig A. Shue; Contextual, Flow-Nased Access Control With Scalable Host-Based SDN Techniques; Infocom. IEEE. Apr. 2016.

Huijun Xiong, Prateek Malhotra, Deian Stefan, Chehai Wu, and Danfeng Yao; User-Assisted Host-Based Detection of Outbound Malware Traffic; Information and Communications Security; pp. 293-307; 2009.

Kuan-Ta Chen, Pollu Huang, and Chin-Laung Lei; How Sensitive Are Network Quaility; Communication of the ACM, Nov. 2006, vol. 49, No. 11.

Yan Chen, Toni Farley, and Nong Ye; QoS Requirements of Network Applications on the Internet; Information, Knowledge, Systems Management 4 (2004) 55-76.

Mark Claypool and Kajal Claypool; On Latency and Player Actions in Online Games; Communications of the ACM, 49(11):40-45, 2006.

Weidong Cui, Randy H. Katz, and Wai-Tian Tan; Design and Implementation of an Extrusion-Based Break-In Detector for Personal Computers; Computer Security Applications Conference, 21st Annual, pp. 10-pp. IEEE, 2005.

Andrew R. Curtis, Jeffrey C. Mogul, Jean Tourrilhes, Praveen Yalagandula, Puneet Sharma, and Sujata Benerjee; Devoflow: Scaling Flow Management for High-Performance Networks; Proceedings of the ACM SIGCOMM 2011 Conference, SIGCOMM '11, pp. 254-265, New York, NY, USA, 2011.

Colin Dixon, Hardeep Uppal, Vjekoslav Brajkovic, Dane Brandon, Thomas Anderson and Arvind Krishnamurthy; ETTM: A Scalable Fault Tolerant Network Manager; Proceedings of the 3th USENIX Conference on Networked Systems Design and Implementation, NSDI'11, pp. 85-98, Berkeley, CA, USA, 2011.

Glenn A. Fink, Vyas Duggirala, Ricardo Correa, and Chris North; Bridging the Host-Network Divide: Survey, Taxonomy, and Solution; Proceedings of the 20th Conference on Large Installation System Administration, LISA '06, 2006.

M. Channegowda, P. Van Daalen, N. Efstathiou, H. Thostrup Jensen, R. Nejabati, I. Torus, H. Trompet, G. Androulidakis, CH. Argyropoulos, K. Baumann, L. Bergesio, S. Buscaglione, J.A. Garcia-Espin, J. Jofre, A. Sevasti,and S. Sune; Deliverable DJ1-2.1: Technology Investigation of Openflow and Testing; Jul. 23, 2013.

Mark Handley, Vern Paxson, and Christian Kreibich; Network Intrusion Detection: Evasion, Traffic Normalization, and End-To-End Protocol Semantics; USENIX Security Symposium, pp. 115-131, 2001.

Soheil Hassas Yeganeh and Yashar Ganjali; Kandoo: A Framework for Efficient and Acalable Offloading of Control Applications; Hot Topics in Software Defined Networks, pp. 19-24. ACM, 2012.

Maciej Kuzniar, Peter Peresini, and Dejan Kostic; What You Need to Know About SDN Flow Tables; Lecture Notes in Computer Science (LNCS), No. EPFL-CONF-204742, 2015.

Long Lu, Vinod Yegneswaran, Phillip Porras, and Wenke Lee; Blade: An Attack-Agnostic Approach for Preventing Drive-By Malware Infections; Proceedings of the 17th ACM conference on Computer and communications security, pp. 440-450. ACM, 2010.

Jad Naous, Ryan Stutsman, David Mazieres, Nick Mckeown, and Nickolai Zeldovich; Delgating Network Security With More Information ACM Workshop on Research on Enterprise Networking, pp. 19-26. ACM, 2009.

Bryan Parno, Zongwei Zhou, and Andrian Perrig; Using Trustworhty Host-Based Information in the Network; Proceedings of the Seventh ACM Workshop on Scalable Trusted Computing, STC '12, pp. 33-44, New York, NY, USA, 2012. ACM.

Jerome H. Saltzer and Michael D. Schroeder; The Protection of Information in Computer Systems; Invited Paper Proceedings OT the IEEE, vol. 63, No. 9 Sep. 1975.

(56) References Cited

OTHER PUBLICATIONS

Peng Sun, Minlan Yu, Michael J. Freedman, Jennifer Rexford, and David Walker; Hone: Joint-Host-Network Traffic Management in Software-Defined Networks; Journal of Network and Systems Management, 23(2):374-399, 2015.
Amin Tootoonchian and Yashar Ganjali; Hyperflow: A Distributed Control Plane for Openflow; Proceedings of the 2010 Internet Network Management Conference on Research on Enterprise Networking, INM/WREN'10,pp. 3-3, Berkeley, CA, USA, 2010.
Amin Tootoonchian , Sergey Gorbunov, Yashar Ganjali, Martin Cassado, and Rob Sherwood; On Controller Performance in Software-Defined Networks; USENIX Conference on Hot Topics in Management of Internet, Cloud, and Enterprise Networks and Services, Hot-ICE'12, pp. 10-10, Berkeley, CA, USA, 2012.
An Wang, Yang Guo, Fang Hao, T.V.Lakshman, and Songging Chen; Scotch: Elastically Scaling Up SDN Control-Plane Using vSWITCH Based Overlay; ACM International on Conference on Emerging Networking Experiments and Technologies, pp. 403-414. ACM, 2014.
Hao Zhang, William Banick, Danfeng Yao, and Naren Ramakrishnam; Using Intention-Based Traffic Dependence Analysis for Anomaly Detection; Security and Privacy Workshops (SPW), 2012 IEEE Symposium on, pp. 104-112. IEEE, 2012.
Jafar Haadi Jararian, Ehab Al-Shaer, Qi Duan; Openflow Random Host Mutation: Transparent Moving Target Defense Using Software Defined Networking; HotSDN'12,pp. 127-132, New York, NY, USA 2012. ACM.

* cited by examiner

SYSTEM AND METHOD FOR NETWORK ACCESS CONTROL

RELATED APPLICATIONS

This patent application claims the benefit of U.S. Provisional Application No. 62/209,929, filed on Aug. 26, 2015, entitled, "Panopticon: Managing User-Level Compromises in Enterprise Networks," and also claims the benefit of U.S. Provisional Application No. 62/265,630, filed on Dec. 10, 2015, entitled "System and Method for Network Access Control," the contents and teachings of each of which are hereby incorporated by reference in their entirety.

BACKGROUND

Computer networks allow users to access information stored within, or associated with, the network. A typical computer network can include multiple client computers that communicate with each other through a system of data communications devices (e.g., switches and routers) and transmission media (e.g., electrical wiring, fiber-optic cable, and/or wireless connections). In general, a transmitting client device exchanges data with a receiving client device by packaging the data using a standard format or protocol to form one or more data structures (e.g., packets, frames, or cells). The transmitting client device transfers these data structures to the receiving client device through the above-described system of computerized devices and transmission media. Once received, the receiving client device can unpackage the data structures and use the data.

Conventional computer networks can be subject to unwanted intrusion or attacks. For example, devices on a network can be subject to user-level network attacks, such as drive-by-downloads (e.g., computer virus or malware) that can occur without a user's knowledge, such as when the user visits a particular website. Network devices can also be subject to user-level network attacks, such as phishing attacks, which can obtain relatively sensitive information, such as passwords and user names from the devices.

To combat user-level network attack, the functionality of intrusion-detection systems (IDS) or tools such as software-defined networking (SDN) can be utilized by computer networks. In software-defined networking, such as provided by the OpenFlow protocol, each network device in the network is configured to review various aspects of network traffic, such as source and destination information. Based upon the review, in the case where the network device is unclear as to how to process the traffic, the network device is configured to request permission from a server device (e.g., a central server device) prior to forwarding the traffic within the network. The server device makes the decision with respect to the traffic.

SUMMARY

The use of intrusion-detection systems to combat user-level network attacks suffers from a variety of deficiencies. For example, to minimize the risk of an attack on a network, enterprises utilize monitoring tools, such as intrusion-detection systems (IDS), at the network boundaries to detect network threats. Unfortunately, these monitoring tools lack visibility into the network devices and other parts of the network which hinders their ability to make informed decisions on perceived threats. For example, the monitoring tools are not aware of the host-level cause (or catalyst) of the network traffic when making security decisions and the monitoring tools use broad rules to allow or deny traffic without the ability to consider details.

Further, while certain network devices, such as switches, can be configured with monitoring tools, the memory and processing requirements of these network devices are limited. As such, these devices can be typically configured to identify only a limited number of possible network threats. Accordingly, the scaling of intrusion detection in networks utilizing switches with monitoring tools is limited.

Also, in certain cases, enterprises can configure each network device with a firewall to limit user-level network attacks. However, because the solution is network device specific, it can be difficult for a systems administrator to manage, particularly for relatively large networks.

By contrast to conventional intrusion-detection systems, embodiments of the present innovation relate to a system and method for network access control. In one arrangement, a computer network includes an access controller configured to receive network access requests from network devices or resources via a restricted subnet that includes only the access controller and the requesting network device. Such a configuration allows the access controller to monitor traffic on a per-flow basis and limits the ability for an attacker to probe the network. The access controller is also configured to receive user interaction information with the network access request from the network device. The user interaction information provides the access controller with insight as to the context of the network access request. For example, the user interaction information can include macroevent information which identifies user intent associated with a particular network access request and microevent information which includes the input and output (I/O) patterns and/or statistics associated with applications and hardware of the network device during operation. Based upon the user interaction information, the access controller can identify a policy relating to the network access request and, based upon the policy, can decide whether to provide the network request to a network router, authorize the network device to communicate directly with another network device, or divert the traffic through an intermediary, such as a security monitor.

With such a configuration, the access controller is provided with visibility into the network devices to make informed decisions on potential threats. Additionally, the access controller can limit or prevent those threats from propagating within the network and causing damage. Further, the network visibility provide to the access controller can be of forensic value by allowing users to understand attacks and appropriately recover from them.

In one arrangement, embodiments of the innovation relate to, in an access controller, a method for providing access to a network resource. The method includes receiving, by the access controller, a network access request and user interaction information associated with the network access request from the client device, the user access information received with the network access request from the client device. The method includes identifying, by the access controller, a policy corresponding to the user interaction information. The method includes providing communication, by the access controller, between the client device and the network resource associated with the network access request based upon the identified policy.

In one arrangement, embodiments of the innovation relate to an access controller that includes a controller having a memory and a processor. The controller is configured to receive a network access request and user interaction information associated with the network access request from the client device, the user access information received with the network access request from the client device; identify a policy corresponding to the user interaction information; and provide communication between the client device and the network resource associated with the network access request based upon the identified policy.

In one arrangement, embodiments of the innovation relate to, in an access controller, a method for providing access to a network resource. The method includes receiving, by the access controller, a network access request from a client device. The method includes receiving, by the access controller, user interaction information associated with the network access request from the client device. The method includes identifying, by the access controller, a policy corresponding to the user interaction information. The method includes transmitting, by the access controller, a second factor authentication request to a second factor authenticator. The method includes, in response to receiving a second factor authentication response, providing communication, by the access controller, between the client device and the network resource associated with the network access request.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a system and method for network access control. In one arrangement, a computer network includes an access controller configured to receive network access requests from network devices or resources via a restricted subnet that includes only the access controller and the requesting network device. Such a configuration allows the access controller to monitor traffic on a per-flow basis and limits the ability for an attacker to probe the network. The access controller is also configured to receive user interaction information with the network access request from the network device. The user interaction information provides the access controller with insight as to the context of the network access request. For example, the user interaction information can include macroevent information which identifies user intent associated with a particular network access request and microevent information which includes the input and output (I/O) patterns and/or statistics associated with applications and hardware of the network device during operation. Based upon the user interaction information, the access controller can identify a policy relating to the network access request and, based upon the policy, can decide whether to provide the network request to a network router, authorize the network device to communicate directly with another network device, or divert the traffic through an intermediary, such as a security monitor. With such a configuration, the access controller is provided with visibility into the network devices to make informed decisions on potential threats.

Figure 1:
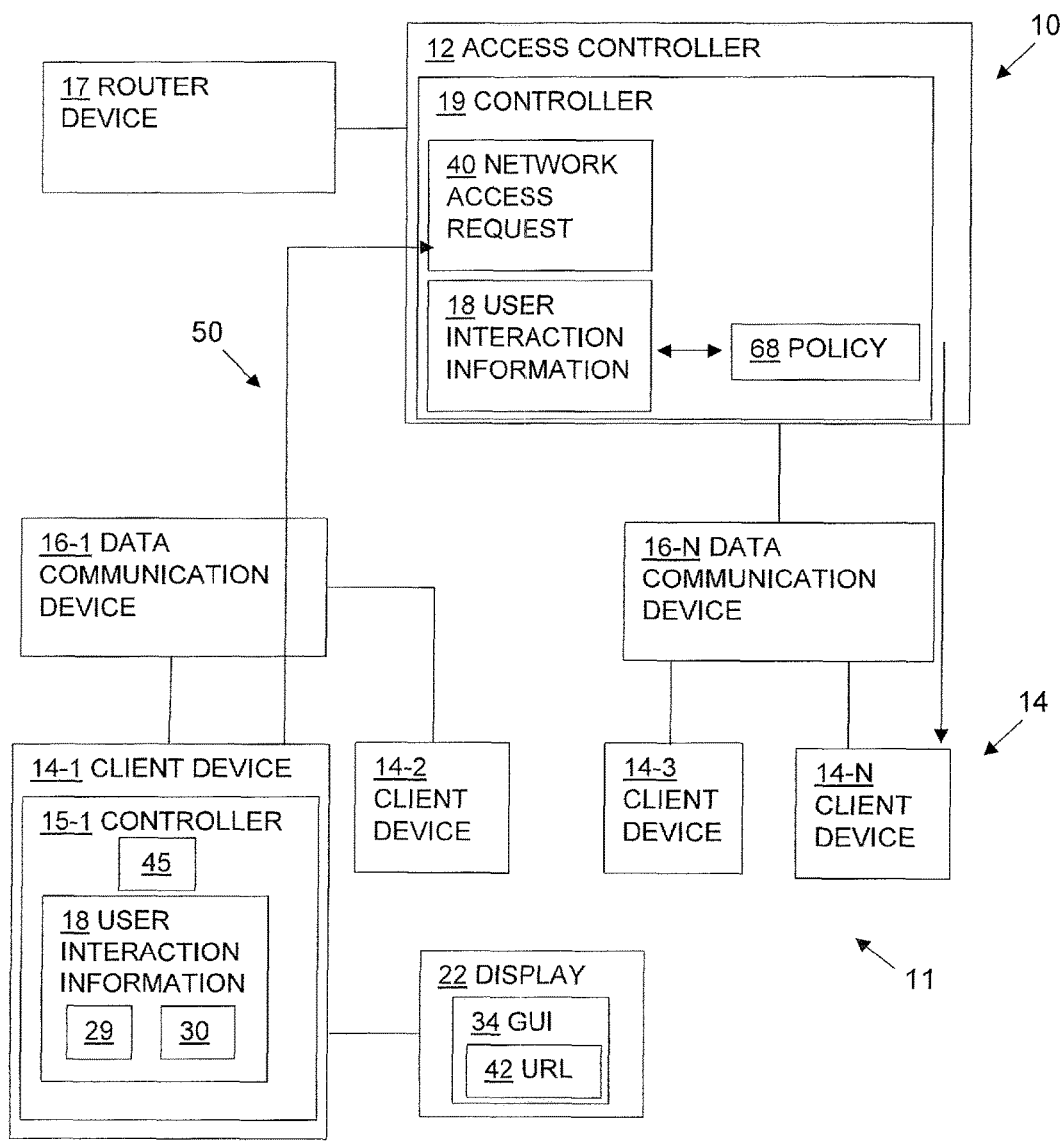
FIG. 1 illustrates a block diagram of a computer network, according to one arrangement.

With such a configuration, the access controller is provided with visibility into the network devices to make informed decisions on potential threats. FIG. 1 illustrates a block diagram of a computer network 10, according to one arrangement. The computer network 10 can be configured in a variety of ways. For example, the computer network 10 can be configured as a local area network (LAN), such as within an enterprise. In another example, the computer network 10 can be configured as a wide area network (WAN), such as across multiple enterprises (e.g., the Internet).

The computer network 10 includes a set of network resources 11, such as one or more network devices or client devices 14, disposed in electrical communication with one or more data communications devices 16 and with an access controller 12. The data communications devices 16-1 through 16-N, such as a computer, switch, router, or gateway, are configured to exchange content among the client devices 14 in the network 10. The network resources 11 can also include a router device 17 disposed in electrical communication with the access controller 12. The router device 17 is configured to provide communication between the client devices 14 of the computer network 10 and computerized devices external to the computer network 10.

In one arrangement, each client device 14-1 through 14-N is configured as a computerized device, such as a laptop or personal computer, having a controller 15-1 through 15-N, respectively, such as a memory and a processor. Alternately, one or more client devices 14 can be configured as peripheral devices, such as printer devices or photocopy devices, having associated controllers.

Each client device 14 is configured to collect and store user interaction information 18 associated with the operation of the client devices 14. In use, the user interaction information 18 is configured to provide the access controller 12 with context related to a network access request 40.

In one arrangement, the user interaction information 18 can include macroevent information 29 which identifies user intent associated with a particular network access request 40. Such user intent can indicate an end user's desire to establish a network connection with a network resource 11 in the computer network 10 or the end user's desire to transmit a message to a network resource 11 within the computer network 10.

For example, with continued reference to FIG. 1, assume the case where a user of a first client device 14-1 wishes to access content on a network device identified by a Uniform Resource Locator (URL) 42, such as provided on an associated display device 22 as a hyperlink. In order to initiate a network connection with the network device, the user can direct the first client device 14-1 to execute the hyperlink associated with the URL 42, such as by clicking on the link using a mouse device. In response to the execution of the hyperlink, the client device 14-1 stores information related to the execution of the URL 42 as macroevent information

29. For example, the macroevent information 29 can include an identification of the URL 42, as well as information pertaining to the execution of the URL hyperlink (e.g., information relating to the time and date of the execution, the identity of the computerized device 14-1 on the computer network 10, the identity of the user, etc.). Accordingly, in this example, the macroevent information 29 identifies the user intent as the desire to receive information from, or to communicate with, a particular resource on the computer network 10 as identified by the URL 42.

In one arrangement, the user interaction information 18 can also include microevent information 30 which relates to at least one user-generated event associated with the client device. While the microevent information 30 can include a variety of types of activity, in one arrangement, the microevent information 30 includes the input and output (I/O) activity associated with the client device 14 during operation such as I/O patterns and/or statistics associated with applications and hardware of the client device 14.

Figure 2:
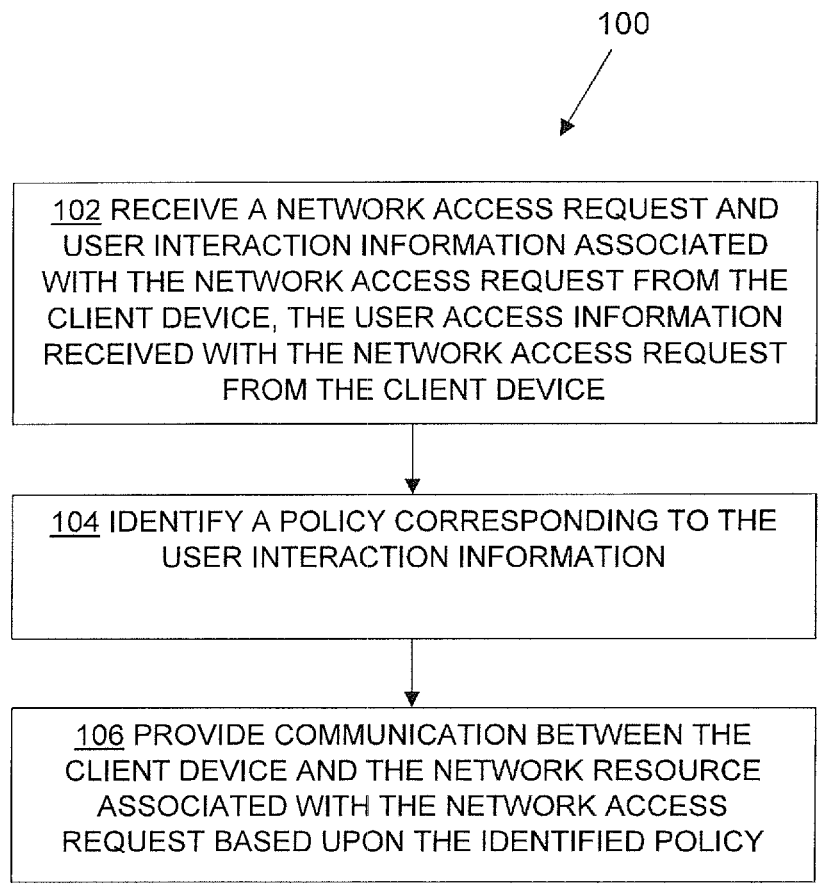
FIG. 2 illustrates a block diagram of a client device developing user interaction information, according to one arrangement.

For example, with reference to FIG. 2, and taking client device 14-1 as an example, the controller 15-1 of the client device 14-1 is configured to record, as the microevent information 30, the I/O interaction of the client device 14-1 with a keyboard device 22 (e.g., the keystrokes made by the user over a given period of time), the I/O interaction of the client device 14-1 with a mouse device 24 (e.g., the position of the cursor on the display and the button clicks associated with the positioning), and/or the I/O interaction of the client device 14-1 with a network device 26, such as a network card (e.g., TCP connections associated with the client device 14-1 and other computerized devices, domain name server (DNS) host names for each client device, etc.) associated with the client device 14-1.

In another example, the controller 15-1 of the client device 14-1 can be configured to record, as the microevent information 30, the I/O interaction of the client device 14-1 with the display device 20. With such a configuration, the microevent information 30 recorded by the client device 14-1 can include a graphical library 32, where the graphical library 32 identifies user interaction associated with a graphical user interface (GUI) 34 provided by the client device 14-1. For example, conventional computerized devices utilize graphical libraries, such as Pango and GTK+, to display text on an associated computer display. In one arrangement, the client device 14-1 is configured to extract the text of the graphical libraries, as provided on the display 22 as part of the GUI 34, and save the extracted text as the microevent information 30. In one arrangement, the client device 12-1 is configured to intercept calls to the graphics library 32 to obtain all of the information associated with a particular GUI 34 without requiring a recompilation of the graphics library 32.

Returning to FIG. 1, as provided above, the computer network 10 includes an access controller 12 which is configured to control the exchange of communications among the client devices 14 based upon the user interaction information 18 received from a client device 14. In one arrangement, the access controller 12 can be configured as a data communications device having a controller 19, such as a processor and memory, and having a unique Internet Protocol (IP) address on the network 10. In one arrangement, the access controller 12 is electrically disposed between the client devices 14 and the router device 17 of the network and can be configured as a silent device, without an IP address. Alternately, the access controller 12 can be configured as an integral component of the router device 17.

The access controller 12 is configured to utilize the user interaction information 18 received from a client device 14 to determine the relative security and context associated with a network access request 40 for connection to a network resource 11 (e.g., another client device 14 on the computer network 10 or to the router device 17). Based upon the context of the request, the access controller 12 can either allow or deny the network access request 40, thereby providing the computer network 10 with a level of security related to communications over the network 10.

FIG. 2 illustrates a flow chart 100 of a procedure performed by the access controller 12 of the network 10 of FIG. 1 when providing access to the network resource, according to one arrangement.

In element 102, the access controller 12 is configured to receive a network access request 40 and user interaction information 18 associated with the network access request 40 from the client device 14, the user access information 18 being received with the network access request 40 from the client device 14.

For example, with reference to FIG. 1, assume the case where a user of a first client device 14-1 wishes to access content provided by a third client device 14-3, as identified by a Uniform Resource Locator (URL) 42. In order to initiate a network connection with the third client device 14-3, the user can direct the first client device 14-1 to generate a network access request 40, such as by executing a hyperlink associated with the URL 42, as displayed by the display device 22. In response to execution of the URL 42, the client device 14-3 generates the network access request 40 and transmits the network access request 40 and the user interaction information 18 to the access controller 12 via a restricted subnet 50 that, in one arrangement, includes only the access controller 12 and the client device 14-1.

In conventional computer networks, network defense mechanisms are traditionally unable to detect or control traffic that occurs within a single network subnet. Unless an organization implements relatively costly measures, such as intrusion detection monitoring at each network switch, or employs network monitoring at each end-host, attackers can largely probe within a subnet with impunity. By contrast to conventional approaches, the client device 14, such as the first client device 14-1 in this example, is configured to delegate traffic to the access controller 12 on a per-flow basis via the restricted subnet 50.

For example, the controller 15 of each client device 14 can be configured with an agent 45, such as an OpenFlow agent, which directs the client device 14 to recognize the access controller 12 as the only device on the computer network 10 (i.e., as part of the restricted subnet 50). For example, the agent 45 can direct the client device 14 to direct all traffic to the IP address of the access controller 12. As such, each time a client device 14 attempts to create a new network connection, such as with a network device associated with the URL 42, the client device 14 is configured to generate and transmit the network access request 40 to the access controller 12 via a restricted subnet 50, as per the direction of the agent 45.

Further, the agent 45 directs the client device 14 to transmit the user interaction information 18 to the access controller 12 along with the network access request 40. With such a configuration, by transmitting the user interaction information 18 with the network access request 40, the client device 14 can minimize the amount of time required by the access controller 12 to process the user interaction information 18. This configuration further allows the access controller 12 to process the network access request 40 without requiring the access controller 12 to utilize a buffer. Conventional network devices utilize a memory or buffer to store incoming messages for processing. As such, these network devices can be at risk for a denial-of-service attack where an attacker floods a device with excessive network access requests cause device to exceed its available memory. These types of attacks result in a denial-of-service condition, where the network device is unable to receive additional, legitimate network access requests. Without the requirement for the use of a buffer, the configuration of access controller 12 can limits or prevents an adversary or attacker from executing a denial-of-service attack on the access controller 12.

Figure 3:
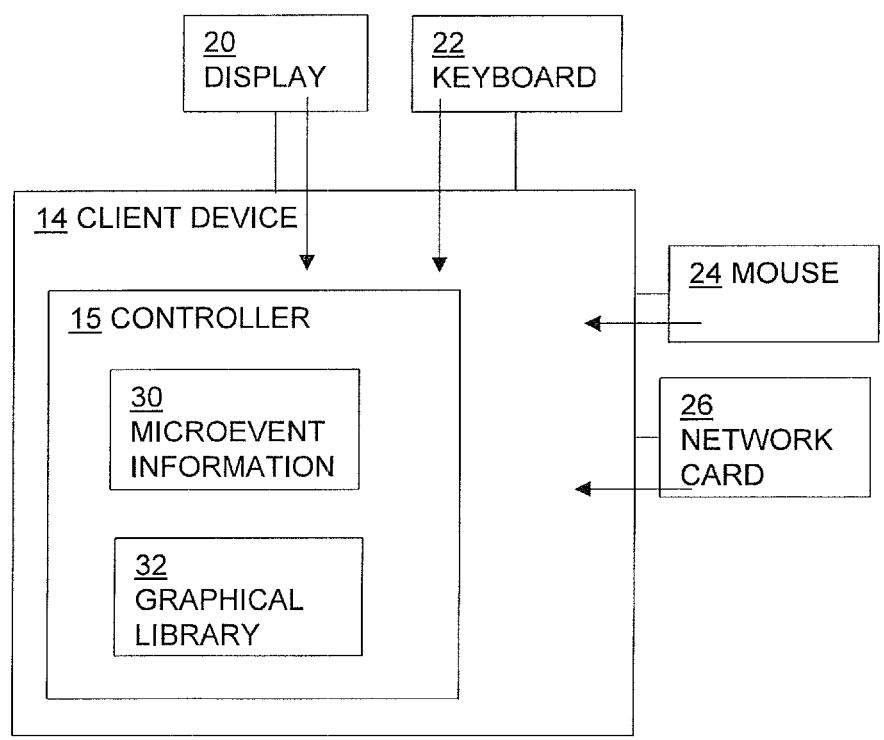
FIG. 3 illustrates a flow chart of a process performed by an access controller of the computer network of FIG. 1.

Returning to FIG. 3, in element 104, the access controller 12 identifies a policy corresponding to the user interaction information 18. In one arrangement, the policy, such as a network access policy, configures the access controller 12 to respond to the network access request 40 in a particular manner (e.g., to allow or deny the request 40) based upon the user interaction information 18 received from the client device 14. As will be provided below, the access controller 12 can utilize either the macroevent information 29 or both the macroevent information 29 and the macroevent information 30 as the user interaction information 18 to identify a policy for response to the network access request 40.

Figure 4:
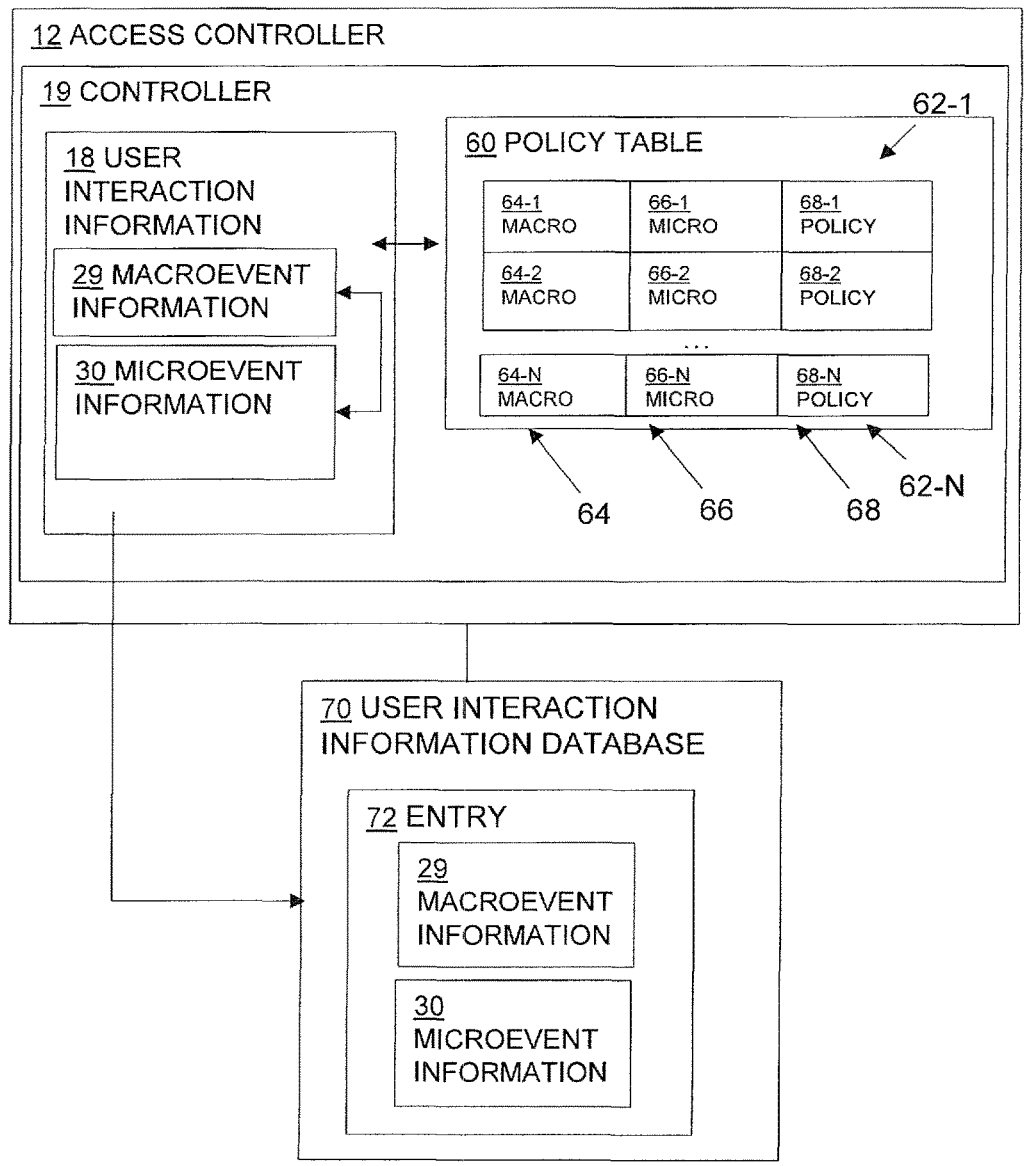
FIG. 4 illustrates a block diagram of an access controller of FIG. 1 identifying a policy based upon received user interaction information, according to one arrangement.

For example, with reference to FIG. 4, the access controller 12 is configured with a policy table 60 having a set of policy entries 62. The policy entries 62 can correlate a variety of types of macroevents and/or microevents with particular network access instructions. For example, each policy table entry 62-1 through 62-N includes a macroevent identifier 64, a microevent identifier 66, and a policy 68 related to the macroevent identifier 64 and microevent identifier 66.

The policy table 60 can be configured such that particular (e.g., known) macroevents generated by a client device 14 results in the access controller 12 either allowing or denying a network connection as requested by a client device 14. For example, assume the case where a first URL is known by a systems administrator to be associated with a device that is a source of malware. In such a case, the systems administrator can configure a macroevent identifier 64-1 to relate to the first URL (e.g., an identification of the URL and/or information pertaining to the execution of a URL hyperlink by a client device 14) and can configure the associated policy 68-1 to instruct the access controller 12 to deny the network access request 40 and refrain from establishing a network connection between the requesting client device 14 and the device associated with the first URL. In another example, assume the case where a second URL is known by a systems administrator to be associated with a known device that is free from malware and had not generated an unwanted intrusion or attack on the computer network 10 in the past. In such a case, the systems administrator can configure a macroevent identifier 64-2 to relate to the second URL (e.g., an identification of the URL and/or information pertaining to the execution of a URL hyperlink by a client device 14) and can configure the associated policy 68-2 to instruct the access controller 12 to allow establish a network connection between the requesting client device 14 and the device associated with the second URL.

The policy table 60 can also be configured such that one or more microevent identifiers 66 provide further context to a macroevent identifier 64. For example, the microevent identifiers 66 can be configured as information relating to particular keystrokes made by the user, the position of a mouse cursor on the display 20, or the TCP connections associated with a particular macroevent identifier 64.

In use, when the access controller 12 receives the user interaction information 18, the access controller 12 can correlate the macroevent information 30 with a policy 68 of the policy table. For example, the access controller 12 compares the macroevent information 30 with each macroevent identifier 64 of the policy entries. Based upon a correspondence (e.g., match) between the macroevent information 30 and one or more macroevent identifier 64, the access controller 12 can identify one or more policies 68 related to the corresponding or matching macroevent identifiers 64.

Also in use, the access controller 12 can utilize the microevent information 30 received from the client device 14 to identify a policy 68 for a response to the network access request 40. For example, assume the case where the access controller 12 has identified a set of macroevent identifiers 64 which correspond to the received macroevent information 29. In such a case, the access controller 12 can be configured to compare the received microevent information 30 with each of the microevent identifiers 66 associated with the set of macroevent identifiers 64. Based upon a correspondence or match between the received macroevent information 29 and a microevent identifier 66 of the set of macroevent identifiers 64, such as microevent identifier 66-1, the access controller 12 can identify the related policy 68-1 as being the policy 68 to be used in responding to the network access request 40.

Returning to FIG. 3, in element 104, the access controller 12 is configured to provide communication between the client device 14 and the network resource 11 associated with the network access request 40 based upon the identified policy 68. Based upon the policy, the access controller 12 can be configured to provide the network request to a network router 17, to authorize the network device 14 to communicate directly with another network device, or to divert the traffic through an intermediary, such as a security monitor (e.g., such as when the policy indicates that the access controller 12 refrain from establishing a network connection based upon the network access request 40).

For example, with additional reference to FIG. 1, assume the case where the policy 68 indicates that, based upon either the macroevent information 29 or both the macroevent information 29 and the microevent information, the network access request 40 (i.e., the request from the first client device 14-1 to access content provided by a third client device 14-3) is valid and should be allowed. In such a case, the access controller 12 is configured to provide a network connection between the first and third client devices 14-1, 14-3. In another example, assume the case where the policy 68 indicates that, based upon either the macroevent information 29 or both the macroevent information 29 and the microevent information, the network access request 40 is associated with an unwanted intrusion or attack and that a network connection should not be established between the first and third client devices 14-1, 14-3. In such a case, the access controller 12 is configured to refrain from providing a network connection between the first and third client devices 14-1, 14-3 and can divert the network access request to an intermediary, such as a security monitor.

With such a configuration, the access controller 12 is provided with visibility into the network devices 14 to make informed decisions on potential threats. As such, the access controller 12 improves security within the computer network 10 by limiting the traffic into the network 10. Additionally, the access controller can limit or prevent those threats from propagating within the network and causing damage. Further, the network visibility provide to the access controller can be of forensic value by allowing users to understand attacks and appropriately recover from them.

As provided above, the user interaction information 18, such as the macroevent information 29 and the microevent information 30, identifies user intent associated with a particular network access request and the input and output (I/O) patterns and/or statistics associated with applications and hardware of a network device 14 during operation, respectively. During operation, also as indicated above, the access controller 12 is configured to receive user interaction information 18 from each network device 14 when the network device 14 initiates a network connection.

Figure 5:
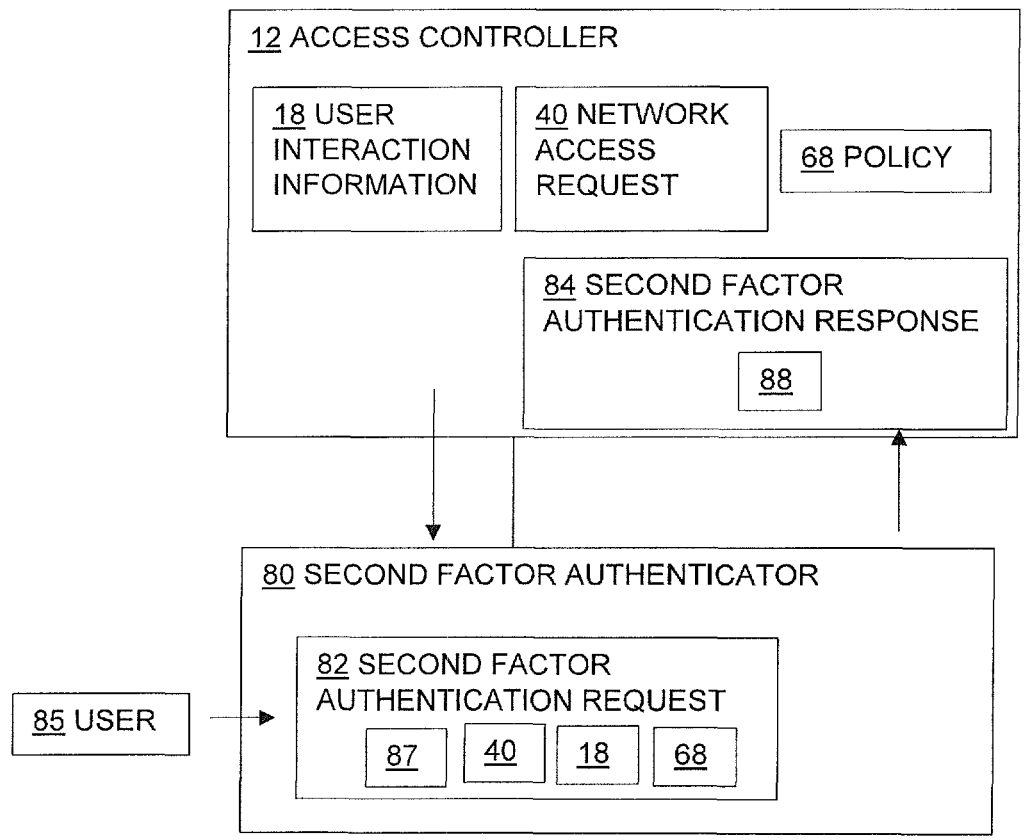
FIG. 5 illustrates a block diagram of an access controller of FIG. 1 utilizing a second factor authenticator, according to one arrangement.

With reference to FIG. 5, in one arrangement, in order to develop a relatively comprehensive insight as to the context of network access requests 40 generated within the computer network 30, the access controller 12 is configured to develop a user interaction information database 70. For example, when a network device or client device 14 transmits a network access request 40 and user interaction information 18 to the access controller 12, the access controller 12 is configured to store the microevent information 29 and the macroevent information 30 as an entry 72 in the user interaction information database 70. With such storage, the user interaction information 18 can be reviewed by a user at a later time, such as part of a forensic review.

For example, assume the case where the computer network 10 experiences an unwanted attack and a client device, such as client device 14-2 becomes compromised. In the case where the access controller 12 has developed the user interaction information database 70, a systems administrator can access the database 70 to review the macroevent and microevent information 29, 30 for all of the client devices 14 on the network 10. During the review process, the systems administrator can identify a source client device 14 that may have originated the attack as well as the path of the attack through the network. Accordingly, based upon the information obtained from the user interaction information database 70, the systems administrator can limit or prevent further spread of the attack in the network 10.

As indicated above, the access controller 12 is configured to provide communication between the client device 14 and the network resource 11 associated with the network access request 40 based upon the identified policy 68. This can include authorizing a client device 14 to communicate directly with another network device, as requested in the network access request 40. However, in certain cases, client devices 14 on the network 10, such as the client device 14-1 that generated the network access request 40, can be unknowingly compromised, such as by spyware or malware. This can lead to the propagation of an attack in the network 10 by the client device 14-1, even in light of the operation of the access controller 12 to identify potential threats associated with the client device 14-1. In order to provide additional security to the network 10 and to minimize errors in computer based policy authentication, the access controller 12 is configured to allow for user involvement in the authentication of a policy 68.

For example, with reference to FIG. 5, prior to providing communication between the client device 14 and the network resource, the access controller 12 is configured to transmit a second factor authentication request 82 to a second factor authenticator 80. In one arrangement, the second factor authenticator 80 is configured as a computerized device having a controller, such as a memory and a processor and is further configured to provide the second factor authentication request 82 to an end user 85. The second factor authentication request 82 can be configured in a variety of ways. In one arrangement, the second factor authentication request 82 includes information such as client device identification information 87 (e.g., information relating to the identity of the first and third client devices 14-1, 14-3), the network access request 40, the user interaction information 18, and the policy 68 identified by the access controller 12.

In use, when the second factor authenticator 80 receives the second factor authentication request 82, the second factor authenticator 80 provides the information 40, 18, 68, 87 associated with the second factor authentication request 82 to the end user 85, such as via a display device. The end user 85 can review the network access request 40, the user interaction information 18, and the policy 68 and can make a determination as to whether or not a network connection between the first client device 14-1 and the third client device 14-3 should be allowed. If the end user 85 determines that, based upon the client device identification information 87, the network access request 40, and/or the user interaction information 18, that the network connection should be allowed, the end user 85 causes the second factor authenticator 80 to generate and transmit a second factor authentication response 84 to the access controller 12. The second factor authentication response 84 is configured to instruct the access controller 12, in this case, that the connection between the first client device 14-1 and the third client device 14-3 should be allowed.

In one arrangement, the access controller 12 is configured to distinguish the second factor authentication response 84 as a user-generated response which is distinct from a machine-generated response. For example, the second factor authentication response 84 can include a user identifier 88, such as an indication that the second factor authentication response 84 is generated in response to an end user's (i.e., persons) review. This user identifier 88 can be configured as a user name, user code, or other user generated information to indicate that the second factor authentication response 84 was generated as a result of human-based interaction rather than a computer-based or machine-based action.

As provided above, the access controller 12 is configured to provide communication between two client devices 14, such as client device 14-1 and client device 14-3, based upon a policy 68 indicating that the network access request 40 from the first client device 14-1 is valid and should be allowed. This configuration of the access controller 12 allows the first and third client devices 14-1, 14-3 directly communicate. In one arrangement, the access controller 12 is further configured to minimize disruption to the connection between the client devices 14-1, 14-3, such as caused by resetting the connection, and to maintain the connection between the client devices 14-1, 14-3 without requiring advanced client device features, such as TCP migration.

In one arrangement, the access controller 12 is configure to transition the communication between the client devices 14-1, 14-3 to use the ephemeral aliases and subnets using network address translation (NAT) pre-routing rules associated with the client devices 14-1, 14-3.

Figure 6:
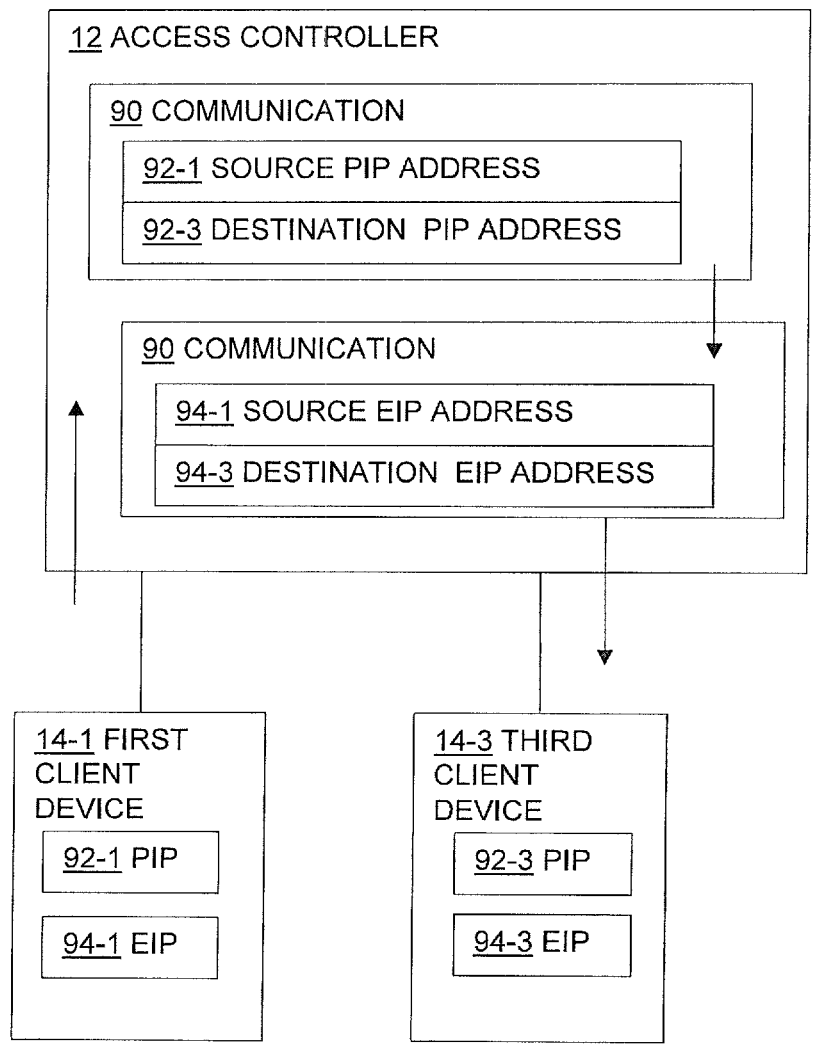
FIG. 6 illustrates a block diagram of an access controller rewriting a network access request header, according to one arrangement.

For example, with reference to FIG. 6, each client device 14-1, 14-3 has a set of identifiers, such as a source or primary IP address (PIP) 92-1, 92-3 and an ephemeral IP address (EIP) 94-1, 94-2. Each client device 14-1, 14-3 is typically configured to use PIP by default. Using the NAT pre-routing rules associated with the client devices 14-1, 14-3, the access controller 12 is configured to selectively transition communication from a client device's PIP to its EIP. In use, the access controller 12 is configured to source and destination IP addresses of the packets exchanged between the client devices 14-1, 14-3 and then allow the packets to be routed according to pre-routing rules associated with the client devices 14-1, 14-3.

Taking the first client device 14-1 as an example, and access controller 12 is configured to receive a communication 90, such as a communication packet, from the client device 14-1 where the communication 90 includes a source communication address 92-1 and a destination communication address 92-3. The access controller 12 is configured to rewrite the source communication address 92-1 with the ephemeral communication address for the first client device 14-1 and the destination address 92-3 with the ephemeral communication address for the third client device 14-3. Since the destination address 92-3 is in the same EIP subnet as the first client device 14-1, the access controller 12 can forward the communication 90 to the ephemeral communication address 94-3 for the third client device 14-3.

As indicated above, when receiving the user interaction information 18, the access controller 12 is configured to receive the user access information 18 with the network access request 40 from a client device 14. With such a configuration, the client device 14 is preconfigured to actively provide user interaction information 18 to the access controller 12 during operation. Such indication is by way of example only. In one arrangement, in response to receiving a network access request 40, the access controller 12 is configured to actively retrieve the user interaction information 18 from the client device. For example, the access controller 12 can transmit a retrieval request to the client device 14 and receive the user interaction information 18 from the client device 14 in response.

As indicated above, during operation of the access controller 12, in the case where a policy 68 indicates that the access controller 12 refrain from establishing a network connection between client devices 14 on the network 10, the access controller 12 can divert network traffic associated with the connection to an intermediary, such as a security monitor. Such indication is provided by way of example only. In one arrangement, in the case where a policy 68 indicates that the access controller 12 refrain from establishing a network connection between client devices 14 on the network 10, the access controller 12 is configured to transmit a second factor authentication request 82, including the network access request 40, the user interaction information 18, and the policy 68 identified by the access controller 12, to a second factor authenticator 80. The second factor authenticator provides an end user 85 with the ability to review the information 80, 40, 68 and override the policy, if necessary.

While various embodiments of the innovation have been particularly shown and described, it will be understood by those skilled in the art that various changes in form and details may be made therein without departing from the spirit and scope of the innovation as defined by the appended claims.

What is claimed is:

1. In an access controller, a method for providing access to a network resource on a computer network, comprising:
   receiving, by the access controller, a network access request and user interaction information associated with the network access request from a client device, the user access information received with the network access request from the client device over the computer network, the client device being distinct from the access controller on the computer network;
   wherein receiving user interaction information associated with the network access request from the client device over the computer network comprises receiving, by the access controller, macroevent information associated with the network access request from the client device, the macroevent information identifying user intent associated with the network access request;
   wherein receiving macroevent information associated with the network access request from the client device further comprises receiving, by the access controller, microevent information associated with the network access request from the client device, the microevent information related to the macroevent information via the user interaction information and identifying at least one user-generated event associated with the macroevent information and the microevent information comprising input and output (I/O) control flow commands identifying user-initiated interaction, including at least one of I/O patterns and I/O statistics, between the client device and at least one of a hardware device associated with the client device and a graphical user interface associated with the client device;
   identifying, by the access controller, a policy corresponding to the macroevent information and the microevent information; and
   based upon the identified policy corresponding to the macroevent information and the microevent information, one of providing communication, by the access controller, between the client device and the network resource associated with the network access request, providing, by the access controller, the network access request to a network router, and diverting, by the access controller, traffic associated with the client device through a security monitor.

2. The method of claim 1, wherein receiving the network access request from the client device comprises receiving, by the access controller, the network access request from the client device via a restricted subnet that includes the access controller and the client device.

3. The method of claim 1, further comprising storing the microevent information and the macroevent information as an entry in a user interaction information database.

4. The method of claim 1, wherein:
   receiving microevent information associated with the network access request from the client device comprises receiving, by the access controller, a graphical library associated with the client device, the graphical library identifying user interaction associated with a graphical user interface (GUI) provided by the client device.

5. The method of claim 1, further comprising:
   prior to providing communication between the client device and the network resource, transmitting, by the access controller, a second factor authentication request to a second factor authenticator; and
   in response to receiving a second factor authentication response, providing communication, by the access controller, between the client device and the network resource associated with the network access request.

6. The method of claim 5, wherein the second factor authentication response is identified as a user-generated response, the user generated response distinct from a machine-generated response.

7. The method of claim 1, further comprising creating, by the access controller, an ephemeral communication address for the client device and an ephemeral communication address for the network resource; and wherein providing communication between the client device and the network resource associated with the network access request comprises:

receiving, by the access controller, a communication from one of the network resource and the client device, the communication having a source communication address and a destination communication address, rewriting, by the access controller, the source communication address with the ephemeral communication address for the client device and the destination address with the ephemeral communication address for the network resource, and forwarding, by the access controller, the communication to one of the ephemeral communication address for the client device and the ephemeral communication address for the network resource.

8. The method of claim 1, wherein macroevent information comprises an identification of a Uniform Resource Locator (URL) executed by the client device and information pertaining to the execution of the URL.

9. The method of claim 8, wherein information pertaining to the execution of the URL comprises information relating to the time and date of the execution of the URL.

10. An access controller, comprising:

a controller having a memory and a processor, the controller configured to:

receive a network access request and user interaction information associated with the network access request from a client device over a computer network, the client device being distinct from the access controller on the computer network, the user access information received with the network access request from the client device;

wherein when receiving user interaction information associated with the network access request from the client device over the computer network, the controller is configured to receive macroevent information associated with the network access request from the client device, the macroevent information identifying user intent associated with the network access request;

wherein when receiving macroevent information associated with the network access request from the client device the controller is configured to receive microevent information associated with the network access request from the client device, the microevent information related to the macroevent information via the user interaction information and identifying at least one user-generated event associated with the macroevent information and the microevent information comprising input and output (I/O) control flow commands identifying user-initiated interaction, including at least one of I/O patterns and I/O statistics, between the client device and at least one of a hardware device associated with the client device and a graphical user interface associated with the client device;

identify a policy corresponding to the macroevent information and the microevent information; and based upon the identified policy corresponding to the macroevent information and the microevent information, one of provide communication between the client device and the network resource associated with the network access request, provide the network access request to a network router, and divert traffic associated with the client device through a security monitor.

11. The access controller of claim 10, wherein when receiving the network access request from the client device, the controller is configured to receive the network access request from the client device via a restricted subnet that includes the access controller and the client device.

12. The access controller of claim 10, wherein the controller is further configured to store the microevent information and the macroevent information as an entry in a user interaction information database.

13. The access controller of claim 10, wherein when receiving microevent information associated with the network access request from the client device, the controller is configured to receive a graphical library associated with the client device, the graphical library identifying user interaction associated with a graphical user interface (GUI) provided by the client device.

14. The access controller of claim 10, further comprising:

prior to providing communication between the client device and the network resource, the controller is configured to transmit a second factor authentication request to a second factor authenticator; and in response to receiving a second factor authentication response, the controller is configured to provide communication between the client device and the network resource associated with the network access request.

15. The access controller of claim 14, wherein the second factor authentication response is identified as a user-generated response, the user generated response distinct from a machine-generated response.

16. The access controller of claim 10, wherein the controller is further configured to create an ephemeral communication address for the client device and an ephemeral communication address for the network resource; and when providing communication between the client device and the network resource associated with the network access request, the controller is configured to:

receive a communication from one of the network resource and the client device, the communication having a source communication address and a destination communication address, rewrite the source communication address with the ephemeral communication address for the client device and the destination address with the ephemeral communication address for the network resource, and forward the communication to one of the ephemeral communication address for the client device and the ephemeral communication address for the network resource.

17. The method of claim 10, wherein macroevent information comprises an identification of a Uniform Resource Locator (URL) executed by the client device and information pertaining to the execution of the URL.

18. The method of claim 17, wherein information pertaining to the execution of the URL comprises information relating to the time and date of the execution of the URL.

* * * * *